No. 826,660. PATENTED JULY 24, 1906.
F. F. HOEHNE.
TRUCK.
APPLICATION FILED NOV. 9, 1905.
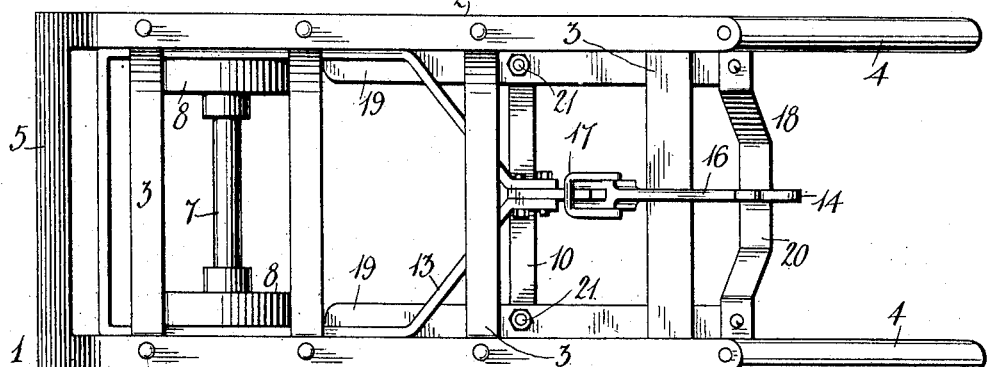
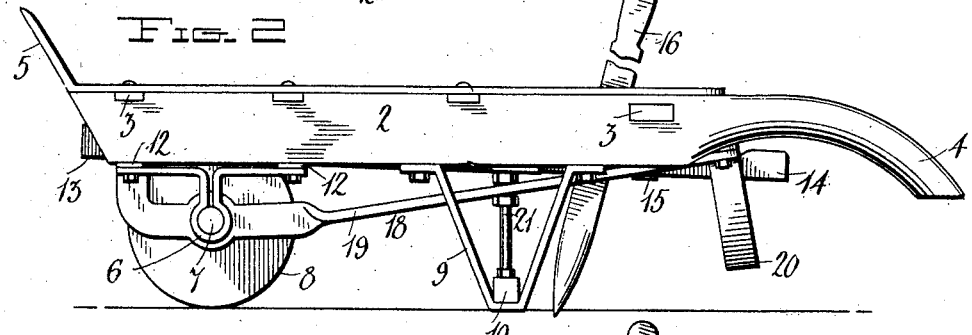
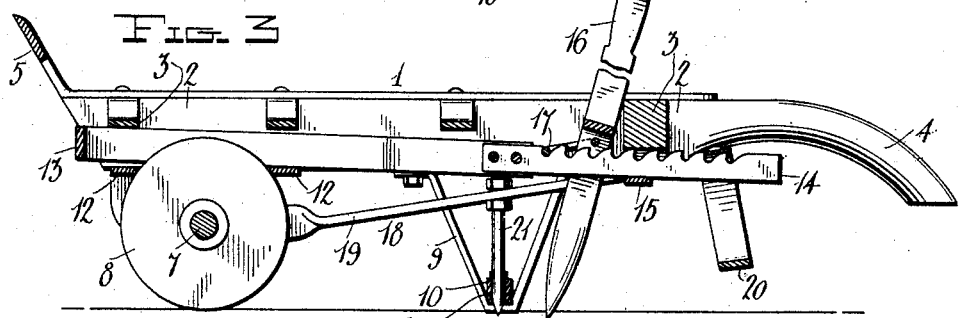
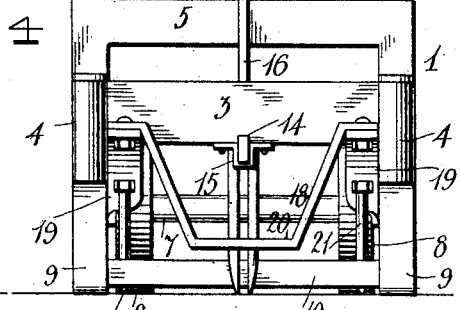
Witnesses
Inventor
F. F. Hoehne
by H. B. Wilson
Attorney

UNITED STATES PATENT OFFICE.

FERDINAND F. HOEHNE, OF KAUKAUNA, WISCONSIN.

TRUCK.

No. 826,660.　　　　　Specification of Letters Patent.　　　　Patented July 24, 1906.

Application filed November 9, 1905. Serial No. 286,603.

*To all whom it may concern:*

Be it known that I, FERDINAND F. HOEHNE, a citizen of the United States, residing at Kaukauna, in the county of Outagamie and State of Wisconsin, have invented certain new and useful Improvements in Trucks; and I do declare the following to be a full, clear, and exact description of the invention, such as will enable others skilled in the art to which it appertains to make and use the same.

This invention relates to improvements in warehouse-trucks.

The object of the invention is to provide a truck having means applied thereto whereby articles moved by the truck may be pushed together and closely packed, thus providing for a considerable saving of floor-space.

The above and other objects, which will appear as the nature of my invention is better understood, are accomplished by the construction illustrated in the accompanying drawings, in which—

Figure 1 is a plan view of a truck constructed in accordance with the invention. Fig. 2 is a side view of the same. Fig. 3 is a longitudinal vertical sectional view, and Fig. 4 is an end view, of the handle end of the truck.

Referring more particularly to the drawings, 1 denotes the truck-frame, which consists of longitudinally-disposed side bars 2, connected together at suitable intervals by transversely-disposed bars 3 and having formed on one end handles 4. To the opposite ends of the side bars 2 is secured the usual foot-piece 5. On the under side of the side bars adjacent to the lower ends of the same are secured bearings 6, in which is journaled a shaft or axle 7, on which is mounted a pair of supporting-wheels 8. On the lower side of the side bars 2 adjacent to the handle ends of the same are secured legs 9, which are connected by a transversely-disposed brace-bar 10.

To the under side of the bars 2, adjacent to the opposite sides of the supporting-wheels, are secured transversely-disposed bars 12, which, together with the transversely-disposed bars 3, form a guide-passage in which is slidably mounted a pushing-frame 13. To the inner end of the pushing-frame is secured a ratchet-bar 14, the free end of which is adapted to slide through a guide-loop 15, secured to the under side of the rear cross-bar 3. In order to operate the pushing-frame 13, a lever 16 is provided, said lever having a bifurcated pointed lower end, which is adapted to be engaged with and to straddle the ratchet-bar 14, the lower pointed end of the lever being adapted to engage the floor or surface upon which the truck is being used. Pivotally mounted on the lever 16 is a bail-shaped pawl 17, said pawl being adapted to engage the teeth of the ratchet-bar 14, whereby when the lever 16 is operated the pushing-frame 13 will be projected beyond the forward end of the truck, as will be understood.

In order to hold the truck against movement when the pushing-frame is being operated, a suitable securing device is provided, said device being here shown, and preferably consists of a foot-lever 18, consisting of parallel forwardly-projecting spring-metal bars 19, the forward ends of which engage the ends of the axle 7 and are turned up into engagement with the under side of the bars 2 of the truck-frame. The opposite ends of the bars 19 are connected by a bail-shaped cross-bar 20, in which the foot of the operator is adapted to be engaged to press the inner ends of the spring-metal bars 19 downwardly. Secured to the bars 19 are downwardly-projecting pointed spurs 21, which are adapted to work through vertically-disposed guide-apertures formed in the brace-bar 10, which connects the legs 9 of the truck, whereby when said spring-metal bars of the foot-lever are pressed downwardly said pointed spurs will be forced into the floor or surface on which the truck is supported, thereby securely holding the truck against movement.

In operation after an article has been carried by the truck to the desired place of deposit the truck is let down so that the legs 9 engage the floor, after which the foot-lever is depressed to force the spurs 21 into the floor, thus securing the truck in a position adjacent to the article to be moved. The lever 16 is now operated to project the pushing-frame 13 into engagement with the article to be moved and which upon a continuous movement of the pushing-frame will be forced up into close engagement with the articles previously deposited, thus compactly storing or loading the articles, which will provide an increase of floor-space for further use. The pushing attachment is intended to be used in connection with the loading or storing of very heavy articles, which would otherwise be difficult to pack closely together.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

1. In a truck of the character described, the combination with the frame of the truck, of a pushing-frame slidably mounted in said truck-frame, a ratchet-bar secured to said pushing-frame, an operating-lever having a bifurcated, pointed lower end adapted to straddle said ratchet-bar and to engage the floor, a pivoted pawl carried by said lever to engage the teeth on said ratchet-bar, pointed holding-spurs arranged in said truck-frame and means to operate said spurs, substantially as described.

2. In a truck of the character described, the combination with the frame of the truck, of a pushing-frame slidably mounted in said truck-frame, a ratchet-bar secured to said pushing-frame, an operating-lever having a bifurcated, pointed lower end adapted to straddle said ratchet-bar and to engage the floor, a pivoted bail-shaped pawl carried by said lever to engage the teeth on said ratchet-bar, a transversely-disposed brace-bar having formed therein guide-passages, a spring foot-lever arranged on said truck, pointed spurs carried by said foot-lever and adapted to be reciprocated thereby through the guide-apertures in said brace-bar to rigidly hold said truck in place when said pushing-frame is operated, substantially as described.

In testimony whereof I have hereunto set my hand in presence of two subscribing witnesses.

FERDINAND F. HOEHNE.

Witnesses:
H. A. KNITTER,
H. W. EIFENBACH.